United States Patent [19]
Baker, Jr.

[11] Patent Number: 5,044,845
[45] Date of Patent: Sep. 3, 1991

[54] SNOWMOBILE TRANSPORT APPARATUS

[76] Inventor: Vernon J. Baker, Jr., Box 424 High St., Athol, N.Y. 12810

[21] Appl. No.: 564,123

[22] Filed: Aug. 8, 1990

[51] Int. Cl.$^5$ ................................................ B60P 7/00
[52] U.S. Cl. ...................................... 410/3; 180/190; 414/462
[58] Field of Search ............... 414/537, 462; 180/190, 180/198; 280/63, 415.1, 7.12; 410/2, 3, 37, 126; 248/500

[56] References Cited

U.S. PATENT DOCUMENTS

| | | | |
|---|---|---|---|
| 3,437,354 | 4/1969 | Hetteen | 280/415.1 |
| 3,672,523 | 6/1972 | Albert | 410/3 X |
| 3,730,552 | 5/1973 | Clark | 410/3 |
| 3,885,690 | 5/1975 | Van Slambrovck | 410/3 X |
| 3,923,335 | 12/1975 | Erickson | 414/537 X |

Primary Examiner—Frank E. Werner
Assistant Examiner—James T. Eller, Jr.
Attorney, Agent, or Firm—Leon Gilden

[57] ABSTRACT

An apparatus including a planar platform formed with a plurality of pairs of spaced forward slots spaced from and aligned relative to rear slots, with a rear slot associated with each forward slot. A hook member is projected through each of the rear slots by rotation of a lever underlying the platform between a forward and rear slot, with an actuator handle directed through each forward slot to rotate the lever. A latch rod is positioned between spaced pairs of hooks to overlie an associated ski of a snowmobile to secure the snowmobile to the platform.

7 Claims, 4 Drawing Sheets

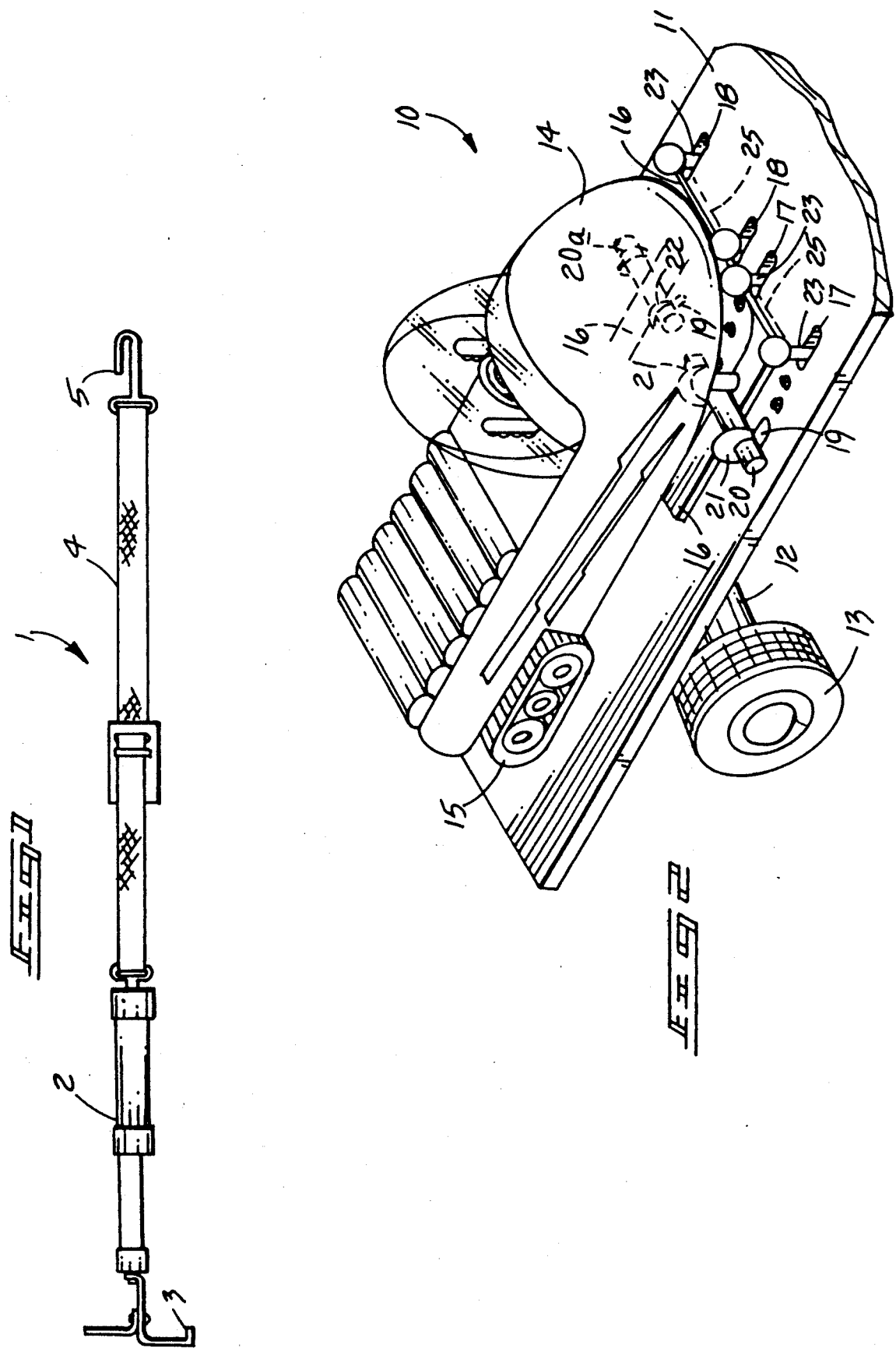

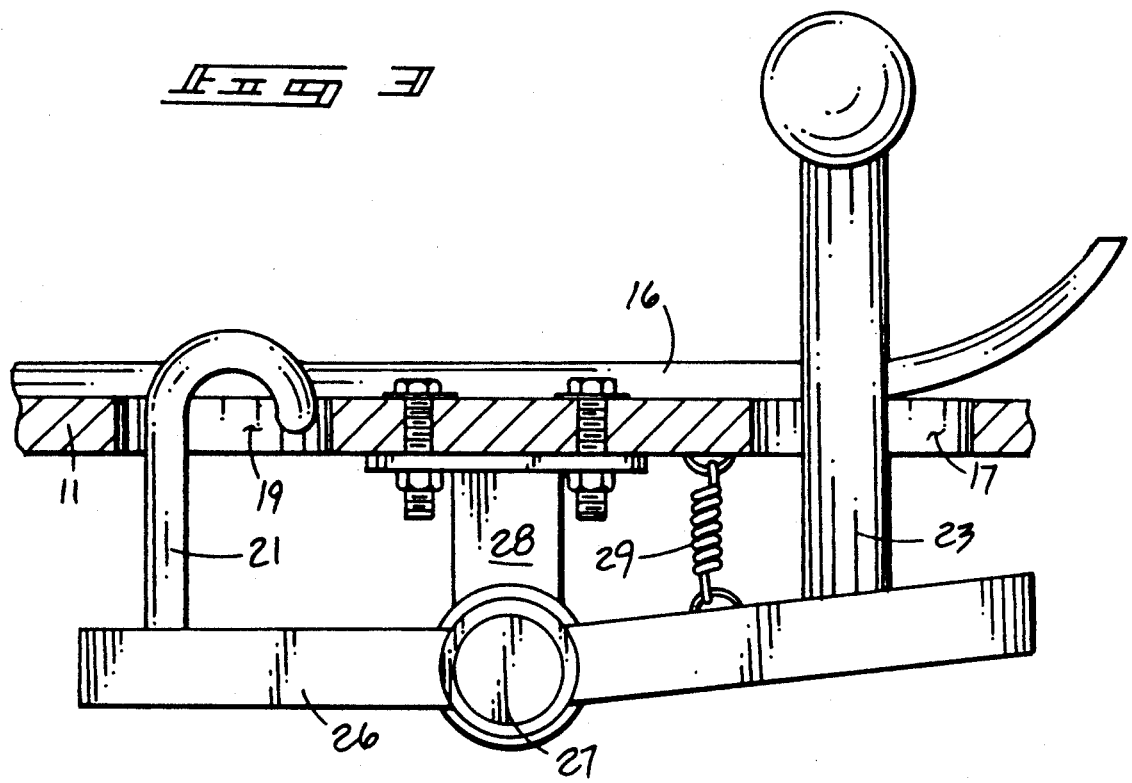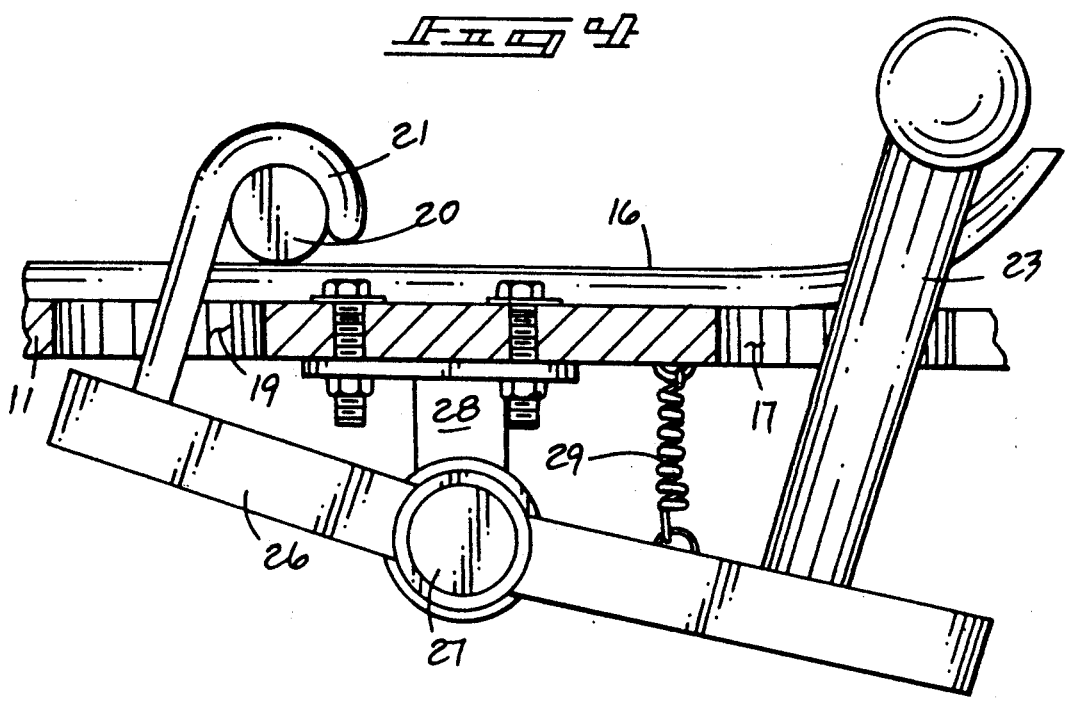

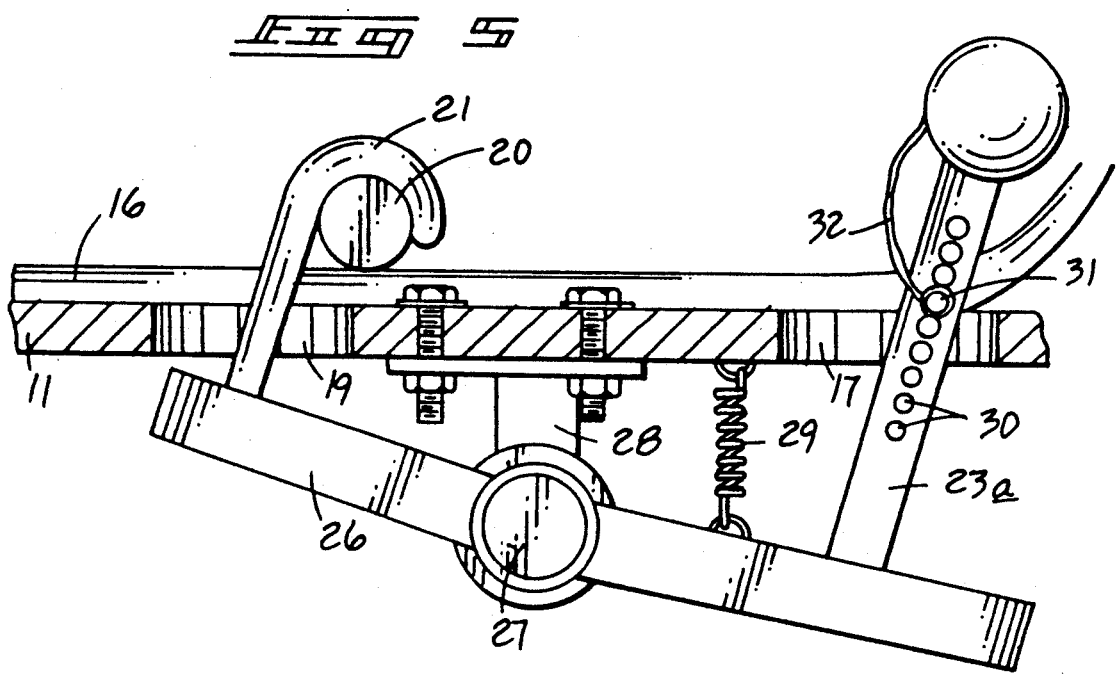
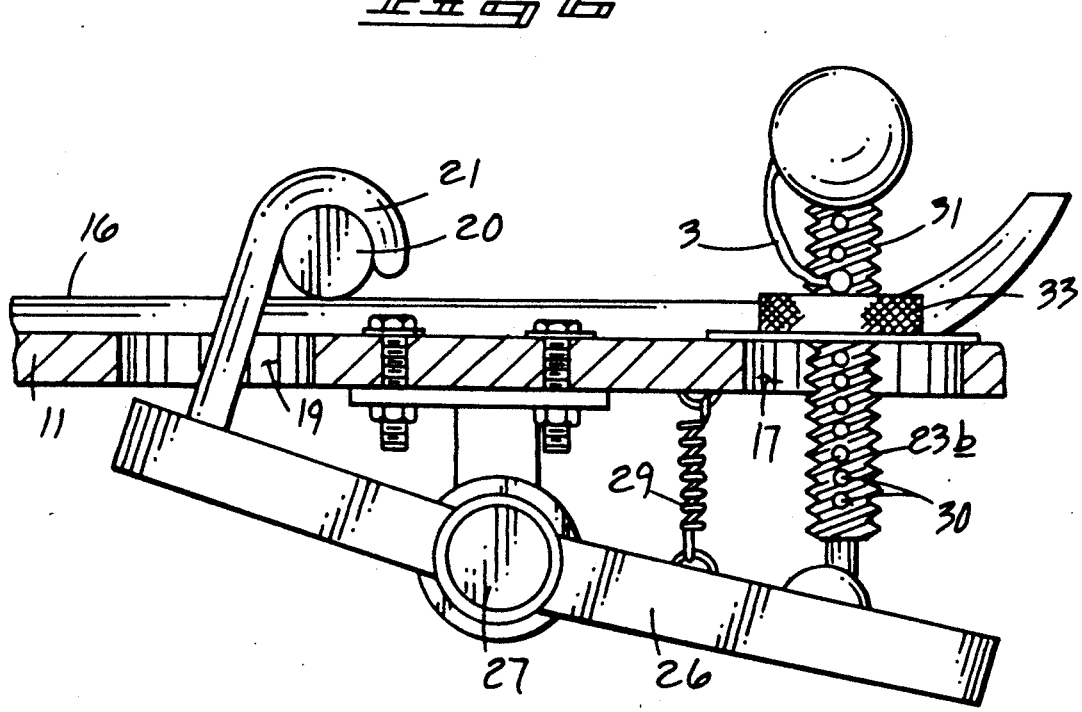

SNOWMOBILE TRANSPORT APPARATUS

BACKGROUND OF THE INVENTION

1. Field of the Invention

The field of invention relates to snowmobile transport apparatus, and more particularly pertains to a new and improved transport apparatus wherein the same permits convenient and secure mounting of a snowmobile relative to a transport platform.

2. Description of the Prior Art

In the transport and storage of various snowmobile vehicles, securement of such vehicles is frequently a cumbersome and elaborate organization. The transport platforms utilized are frequently drawn through relatively primitive or undeveloped roads requiring relative security in the mounting of a snowmobile to a transport vehicle. Various mounting apparatus has been utilized in the prior art and is typically exemplified by a various flexible strap of a type such as set forth in U.S. Pat. No. 4,842,236 to Younts wherein an elongate flexible strap is secured to a telescoping spring-loaded mechanism, wherein the spring-loaded mechanism and the strap each include a hook member for mounting and latching of a vehicle are relative to a transport platform.

U.S. Pat. No. 4,718,632 to Meineke provides a holddown mechanism utilizing an engagement boss for securement to a lip of an assembly to be supported upon a platform.

U.S. Pat. No. 4,475,855 to Crissy provides for a cargo anchor mechanism utilizing a telescoping jack member mounted a control track at one end and a clamp portion at an opposed end thereof.

U.S. Pat. No. 4,190,262 utilizes opposed tether lines with hooks mounted thereon for drawing the tether lines to secure a load to an associated vehicle.

U.S. Pat. No. 4,165,142 to Grabau utilizes a hook member to overlie an arcuate outer portion of a connector housing.

As such, it may be appreciated that there continues to be a need for a new and improved snowmobile transport apparatus which addresses both the problems of ease of use as well as effectiveness of construction and in this respect, the present invention substantially fulfills this need.

SUMMARY OF THE INVENTION

In view of the foregoing disadvantages inherent in the known types of transport apparatus now present in the prior art, the present invention provides a snowmobile transport apparatus wherein the same provides convenient and effective securement of a snowmobile relative to a platform. As such, the general purpose of the present invention, which will be described subsequently in greater detail, is to provide a new and improved snowmobile transport apparatus which has all the advantages of the prior art transport apparatus and none of the disadvantages.

To attain this, the present invention provides an apparatus including a planar platform formed with a plurality of pairs of spaced forward slots spaced from and aligned relative to rear slots, with a rear slot associated with each forward slot. A hook member is projected through each of the rear slots by rotation of a lever underlying the platform between a forward and rear slot, with an actuator handle directed through each forward slot to rotate the lever. A latch rod is positioned between spaced pairs of hooks to overlie an associated ski of a snowmobile to secure the snowmobile to the platform.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved snowmobile transport apparatus which has all the advantages of the prior art transport apparatus and none of the disadvantages.

It is another object of the present invention to provide a new and improved snowmobile transport apparatus which may be easily and efficiently manufactured and marketed.

It is a further object of the present invention to provide a new and improved snowmobile transport apparatus which is of a durable and reliable construction.

An even further object of the present invention is to provide a new and improved snowmobile transport apparatus which is susceptible of a low cost of manufacture with regard to both materials and labor, and which accordingly is then susceptible of low prices of sale to the consuming public, thereby making such snowmobile transport apparatus economically available to the buying public.

Still yet another object of the present invention is to provide a new and improved snowmobile transport apparatus which provides in the apparatuses and methods of the prior art some of the advantages thereof, while simultaneously overcoming some of the disadvantages normally associated therewith.

Still another object of the present invention is to provide a new and improved snowmobile transport apparatus wherein the same utilizes manually pivotal levers to engage opposed end portions of a support rod for securement of a snowmobile ski track to an associated platform.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top orthographic view of a prior art securement apparatus.

FIG. 2 is an isometric illustration of the instant invention.

FIG. 3 is an orthographic side view, taken in elevation, of a typical latch unit utilized by the instant invention.

FIG. 4 is an orthographic view, taken in elevation, of the latch unit as set forth in FIG. 3 in a clamping relationship relative to a ski member.

FIG. 5 is an orthographic view, taken in elevation, of a modified latch unit utilizing a handle formed with aligned apertures and a lock pin therefore.

FIG. 6 is an orthographic view, taken in elevation, of a latch unit utilizing a further modified handle utilizing aligned apertures, a lock pin, and a threaded connector relationship to secure and maintain the latch unit in a relationship relative to a support platform.

DESCRIPTION OF THE PREFERRED EMBODIMENT

Figure 7:
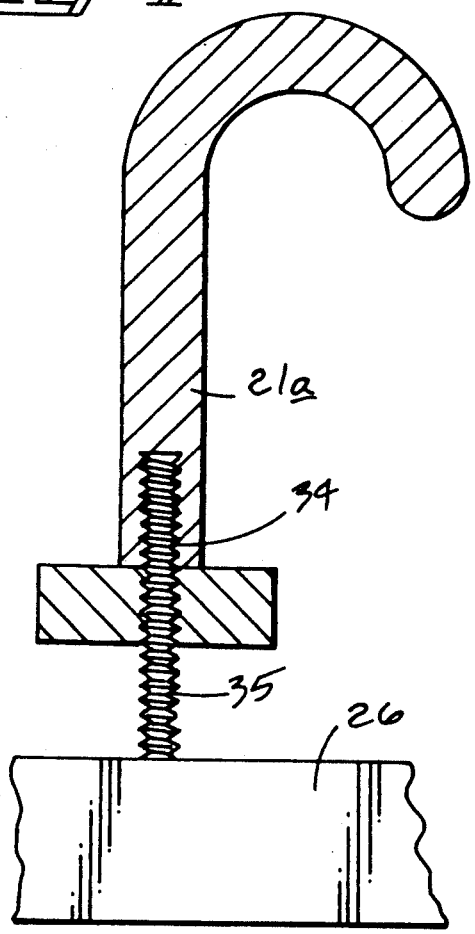
FIG. 7 is an orthographic cross-sectional illustration of a modified hook member utilized by the instant invention.

With reference now to the drawings, and in particular to FIGS. 1 to 8 thereof, a new and improved snowmobile transport apparatus embodying the principles and concepts of the present invention and generally designated by the reference numeral 10 will be described.

FIG. 1 illustrates a prior art securement apparatus 1 wherein a spring-loaded member 2 includes a first hook 3, wherein the strap 4 includes a second hook 5 for overlying securement relative to a vehicle for mounting to a support platform.

More specifically, the snowmobile transport apparatus 10 of the instant invention essentially comprises an elongate planar platform 11, including a support axle 12 mounting a plurality of wheels 13 for transport of an associated snowmobile 14 mounted to an upper surface of the platform. The snowmobile 14 is of conventional construction utilizing a rear drive tread 15 and spaced elongate ski members 16 utilized for guidance and steerage of the snowmobile.

A first pair of spaced parallel slots 17 are directed through the planar platform in an aligned parallel relationship to a plurality of second pair of spaced slots 18. Each slot 17 and 18 is aligned within an associated rear slot 19 that is positioned rearwardly of each forward slot 17 and 18. FIG. 3 illustrates a typical latching unit including a forward slot and a rear slot, with a forward slot including an actuator rod 23 projecting through a forward slot and extending below the platform 11 and orthogonally and integrally mounted to an actuator lever 26. The actuator lever 26 is pivotally mounted about an actuator lever shaft 27 extending parallel and below a bottom surface of the platform 11 mounted to a support boss 28. A hook member 21 projects orthogonally and integrally adjacent a rear terminal end of the lever 26 and upwardly through an associated rear slot 19 terminating in a hook-shaped portion. The first pair of slots 17 utilizes first latch hooks 21 while the second pair of slots 18 is indicated to utilize the second pair of latch hooks 22. A latch rod 20 is positioned over a right ski member 16, whereupon projecting of the actuator rod 23 downwardly lifts the associated first hooks 21 upwardly and whereupon release of the actuator rod 23 biases the first pair of latch hooks 21 downwardly by use of a biasing spring 29 mounted to a lower surface of the platform 11 at a first end of the spring 29 and mounted to an upper surface of the lever 26 between the actuator rod 23 and the actuator lever shaft 27, in a manner as illustrated in FIG. 4. A second latch rod 20a cooperates with the second pair of latch hooks 22 in a similar manner. If desired, an optional cross bolt 25 may be mounted (see FIG. 2) orthogonally and integrally to the actuator rods 23 of the first and second pairs of actuator rods through the first and second pairs of slots to permit the first and second pairs of actuator rods to be utilized in unison, in a manner as illustrated in FIG. 2. The support boss 28 of each latch unit defined by an associated actuator rod 23, an actuator lever 26, and a hook 21 or 22 is spaced from the bottom surface of the platform 11 by the support boss 28, as illustrated in FIGS. 3 and 4 for example.

FIG. 5 illustrates the use of a modified actuator rod 23a and actuator unit utilized by the instant invention, wherein the modified actuator rod 23a includes a series of longitudinally aligned latch apertures 30 directed through the modified actuator rod 23a, whereupon latching of an associated latch rod 20 for example permits an operator to direct a latch pin 31 through an associated aperture 30 above the platform 11, wherein the latch pin 31 is mounted to a tether line 32 secured to the actuator rod 23a to prevent the actuator rod 23a from projecting downwardly through the forward slot 17 and enable disengagement of the associated hook 21 from the latch rod 20.

A further modified actuator rod 23b utilizes the longitudinally aligned apertures 30, wherein the modified actuator rod 23b includes a threaded shaft that is cooperative with a knurled lock nut 33, whereupon positioning of the associated hook 21 above the latch rod 20 to secure a ski member 16, the knurled nut 33 is threaded downwardly into engagement With an upper surface of the platform 11, whereupon an associated latch pin 31 is directed through an aperture positioned above the lock nut 33 to prevent the modified actuator rod 23b from projecting downwardly below the platform 11 during use.

FIG. 7 illustrates a modified hook member 21a wherein the modified hook member 21a includes a threaded bore 34 projecting interiorly and longitudinally of the elongate shank of the hook 21a to receive a threaded rod 35 mounted to the lever 26 to permit vertical adjustment of the hook 21a to accommodate various thicknesses of ski members 16 mounted upon the platform 11.

Figure 8:
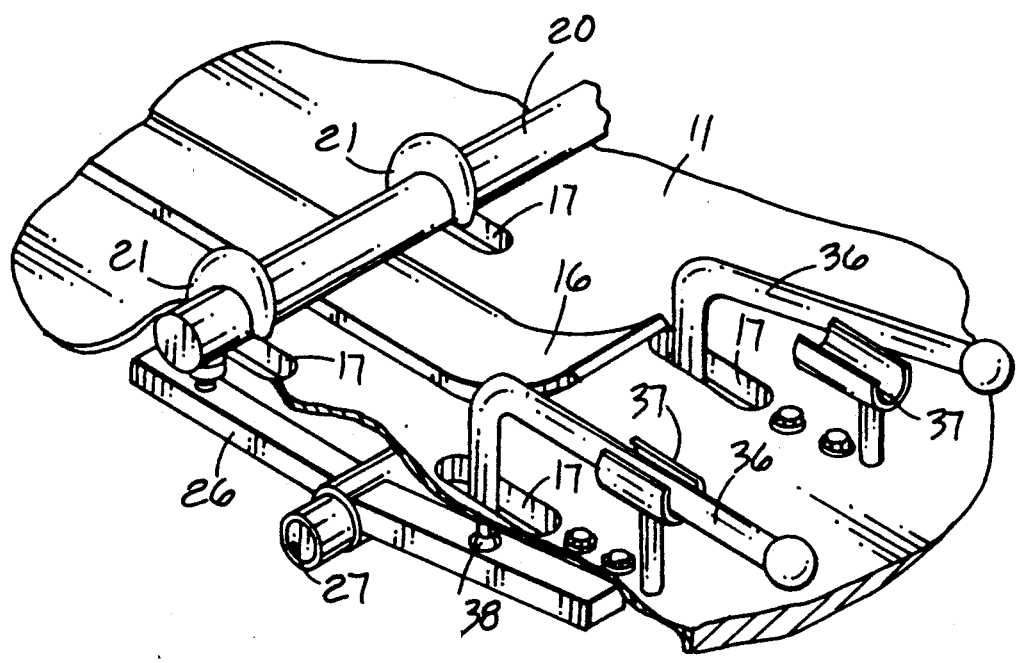
FIG. 8 is an isometric illustration of a further modified actuator handle arrangement utilized by the instant invention.

FIG. 8 illustrates the latch units including modified "L" shaped actuator rods 36 that are mounted to the associated actuator lever 26 by a pivot connection 38, wherein each "L" shaped actuator rod 36 is mounted within a support channel 37 to prevent displacement of the actuator rod 36 subsequent to locking of the hooks 21 to the associated latch rod 20.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A snowmobile transport apparatus comprising, in combination,
    a planar platform having two wheels depending downwardly therefrom and suitable for towing behind a vehicle, the planar platform including a first pair of spaced parallel forward slots directed through the platform, and
    a second pair of spaced parallel forward slots directed through the platform, wherein the first and second pair of forward slots are in a parallel coextensive aligned relationship relative to one another transversely directed across the platform, and
    each forward slot includes a rear slot spaced from and aligned with each forward slot, and
    a movable hook member directed and projecting upwardly through each rear slot, and an actuator rod directed through each forward slot for moving an associated hook member, and
    the first pair of forward slots cooperative with a plurality of rear slots defining a first pair of rear slots, and the second pair of forward slots cooperative with a plurality of rear slots to define a second pair of rear slots, and
    a first transversely directed latch rod cooperative with the hook members directed through the first pair of rear slots, and second transversely directed latch rod cooperative with the second pair of rear slots, wherein a respective snowmobile ski member is securable between each of the first and second pairs of rear slots respectively.

2. An apparatus as set forth in claim 1 wherein the hook member is integrally mounted adjacent a rear upper surface of an actuator lever, and the actuator rod is integrally mounted adjacent an upper forward end of the actuator lever, and the actuator lever includes an actuator lever shaft to rotatably mount the actuator lever, and the actuator lever shaft is mounted to a support boss, wherein the support boss is integrally mounted to a bottom surface of the platform.

3. An apparatus as set forth in claim 2 including a biasing spring, with an upper end of the biasing spring mounted to the bottom surface of the platform, and a lower end of the biasing spring secured to the actuator lever between the actuator rod and the actuator lever shaft.

4. An apparatus as set forth in claim 3 wherein the actuator rod includes a series of longitudinally aligned apertures orthogonally directed through the actuator rod, and further including a lock pin cooperative with one of said apertures spaced above the platform to prevent the actuator rod from projecting through a forward slot, and a tether line mounted to the lock pin and to the actuator rod to maintain the lock pin relative to the actuator rod.

5. An apparatus as set forth in claim 4 wherein the actuator rod includes an externally threaded configuration cooperative with an internally threaded nut member, and the nut member captured between the lock pin and the upper surface of the platform when cooperative hook member is secured overlying associated actuator rod.

6. An apparatus as set forth in claim 5 wherein each hook member includes an elongate shank, the elongate shank includes an internally threaded bore, and a threaded rod mounted to the actuator lever and threadedly received within the threaded bore to permit adjustment of each hook member relative to each actuator lever.

7. An apparatus as set forth in claim 6 wherein each first and second pair of actuator rods includes a cross bolt orthogonally and integrally mounted to each pair of actuator rods to operate each of the first and second pair of actuator rods in unison.

* * * * *